United States Patent
McLaughlin et al.

(10) Patent No.: US 10,248,601 B2
(45) Date of Patent: Apr. 2, 2019

(54) REMOTE TERMINAL UNIT (RTU) WITH UNIVERSAL INPUT/OUTPUT (UIO) AND RELATED METHOD

(71) Applicant: Honeywell International Inc., Morristown, NJ (US)

(72) Inventors: Paul F. McLaughlin, Ambler, PA (US); David A. Eisner, San Francisco, CA (US); Jason T. Urso, Fountain Hills, AZ (US)

(73) Assignee: Honeywell International Inc., Morris Plaines, NJ (US)

( * ) Notice: Subject to any disclaimer, the term of this patent is extended or adjusted under 35 U.S.C. 154(b) by 426 days.

(21) Appl. No.: 14/228,142

(22) Filed: Mar. 27, 2014

(65) Prior Publication Data
US 2015/0278144 A1    Oct. 1, 2015

(51) Int. Cl.
*G06F 13/00* (2006.01)
*G06F 13/40* (2006.01)
*G06F 9/445* (2018.01)

(52) U.S. Cl.
CPC ...... *G06F 13/4027* (2013.01); *G06F 9/44505* (2013.01); *Y02D 10/14* (2018.01); *Y02D 10/151* (2018.01)

(58) Field of Classification Search
CPC .......................... G06F 13/4027; G06F 9/44505
USPC ...................................................... 710/104
See application file for complete search history.

(56) References Cited

U.S. PATENT DOCUMENTS

| 5,095,417 | A | | 3/1992 | Hagiwara |
| 5,357,517 | A | | 10/1994 | Takebe |
| 5,958,030 | A | * | 9/1999 | Kwa ................ G06F 11/2733 361/600 |
| 6,118,350 | A | * | 9/2000 | Gupta ................ H03H 7/383 257/536 |

(Continued)

FOREIGN PATENT DOCUMENTS

| JP | 2007527073 A | 9/2007 |
| JP | 4990755 B2 | 8/2012 |

(Continued)

OTHER PUBLICATIONS

Notification of Transmittal of the International Search Report and the Written Opinion of the International Searching Authority, or the Declaration dated Jun. 10, 2015 in connection with International Patent Application No. PCT/US2015/019571.

(Continued)

*Primary Examiner* — Chun Kuan Lee

(57) ABSTRACT

A system includes at least one industrial control and automation field device and a remote terminal unit (RTU). The RTU includes input/output (I/O) terminals configured to be coupled to the field devices. The RTU also includes one or more I/O modules having one or more reconfigurable I/O channels configured to be coupled to the I/O terminals. Each reconfigurable I/O channel is configurable as an analog input, an analog input supporting digital communication, an analog output, an analog output supporting digital communication, a digital input, a digital output, and a pulse accumulator input. The RTU further includes at least one processing device configured to control a configuration of each of the one or more reconfigurable I/O channels.

18 Claims, 10 Drawing Sheets

(56) References Cited

U.S. PATENT DOCUMENTS

| | | | |
|---|---|---|---|
| 6,639,806 B1* | 10/2003 | Chuang | G06F 1/184 |
| | | | 361/748 |
| 7,555,004 B2 | 6/2009 | Orlik et al. | |
| 7,969,300 B2 | 6/2011 | Coronel et al. | |
| 8,072,098 B2 | 12/2011 | Elias et al. | |
| 8,239,046 B2 | 8/2012 | Koehler | |
| 8,315,263 B2 | 11/2012 | Enns et al. | |
| 8,352,049 B2 | 1/2013 | Hsiung et al. | |
| 8,392,626 B2 | 3/2013 | Wormmeester et al. | |
| 8,583,067 B2 | 11/2013 | Budampatl et al. | |
| 8,656,065 B1 | 2/2014 | Gerhart et al. | |
| 8,667,091 B2 | 3/2014 | Almadi et al. | |
| 8,868,907 B2 | 10/2014 | Graham et al. | |
| 9,021,255 B1 | 4/2015 | Aharoni et al. | |
| 9,379,972 B2 | 6/2016 | Enns | |
| 2002/0147503 A1 | 10/2002 | Osburn, III | |
| 2003/0151513 A1 | 8/2003 | Herrmann | |
| 2004/0259533 A1 | 12/2004 | Nixon | |
| 2005/0174964 A1 | 8/2005 | Orlik et al. | |
| 2005/0216107 A1 | 9/2005 | O'Donnell et al. | |
| 2005/0243867 A1 | 11/2005 | Petite | |
| 2005/0273205 A1 | 12/2005 | Nickerson | |
| 2006/0087402 A1 | 4/2006 | Manning | |
| 2006/0202728 A1 | 9/2006 | Wich | |
| 2006/0240818 A1 | 10/2006 | McCoy et al. | |
| 2007/0280144 A1 | 12/2007 | Hodson et al. | |
| 2008/0077336 A1* | 3/2008 | Fernandes | G01R 15/142 |
| | | | 702/57 |
| 2008/0080395 A1 | 4/2008 | Law | |
| 2009/0201150 A1 | 8/2009 | Becker | |
| 2009/0224906 A1 | 9/2009 | Balgard | |
| 2009/0271558 A1* | 10/2009 | Wormmeester | G06F 13/4072 |
| | | | 710/316 |
| 2009/0316628 A1 | 12/2009 | Enns et al. | |
| 2010/0079007 A1 | 4/2010 | Elias | |
| 2010/0176933 A1 | 7/2010 | Barragan | |
| 2011/0110291 A1 | 5/2011 | Ishii | |
| 2011/0246791 A1 | 10/2011 | Kambayashi | |
| 2011/0276607 A1 | 11/2011 | Surna et al. | |
| 2012/0041574 A1 | 2/2012 | Hsiung et al. | |
| 2012/0063330 A1 | 3/2012 | Mori | |
| 2012/0078869 A1 | 3/2012 | Bellville | |
| 2012/0084400 A1 | 4/2012 | Almadi | |
| 2012/0151588 A1 | 6/2012 | Wang et al. | |
| 2012/0230446 A1 | 9/2012 | Feng | |
| 2012/0236768 A1 | 9/2012 | Kolavennu et al. | |
| 2012/0290735 A1 | 11/2012 | Johnson et al. | |
| 2013/0110998 A1 | 5/2013 | Zrelli | |
| 2013/0151849 A1 | 6/2013 | Graham et al. | |
| 2013/0173840 A1 | 7/2013 | Calvin | |
| 2013/0246801 A1 | 9/2013 | Takahashi | |
| 2013/0262064 A1* | 10/2013 | Mazzaro | G05B 23/0283 |
| | | | 703/7 |
| 2013/0307699 A1 | 11/2013 | Brekke | |
| 2013/0344839 A1 | 12/2013 | Roach | |
| 2014/0119290 A1 | 5/2014 | Grewal | |
| 2014/0232555 A1 | 8/2014 | Aakvaag | |
| 2014/0321443 A1 | 10/2014 | Samudrala | |
| 2015/0058480 A1 | 2/2015 | Allgaier | |
| 2015/0304193 A1 | 10/2015 | Ishii | |
| 2016/0048474 A1 | 2/2016 | Lv et al. | |

FOREIGN PATENT DOCUMENTS

| | | |
|---|---|---|
| JP | 2013535730 A | 9/2013 |
| KR | 20100066815 A | 6/2010 |
| KR | 20120135142 A | 12/2012 |
| WO | WO 2005/086110 A2 | 9/2005 |
| WO | WO 2014/197182 A1 | 12/2014 |
| WO | WO 2015/047744 A1 | 4/2015 |

OTHER PUBLICATIONS

U.S. Patent Application "Remote Terminal Unit (RTU) With Wireless Diversity and Related Method" U.S. Appl. No. 14/035,557, filed Sep. 24, 2013. 33 pages.

International Search Report dated Oct. 10, 2014 in connection with International Application No. PCT/US2014/038208; 3 pages.

Written Opinion of the International Searching Authority dated Oct. 10, 2014 in connection with International Application No. PCT/US2014/038208; 5 pages.

International Search Report dated Dec. 11, 2014 in connection with International Application No. PCT/US2014/055307; 4 pages.

Written Opinion of the International Searching Authority dated Dec. 11, 2014 in connection with International Application No. PCT/US2014/055307; 7 pages.

European Search Report dated Sep. 22, 2014 in connection with European Patent Application No. 14164273.6; 3 pages.

David D. Brandt, "Solving the Issue of Interoperability among Devices and Systems", May 19, 2008, p. 1-21, XP055091082.

Supplementary European Search Report dated Apr. 28, 2017 in connection with European Patent Application No. EP 14 84 8127.

International Search Report and Written Opinion dated Oct. 27, 2015 in connection with PCT/US2015/043607; 12 pages.

"25A Right Angle Signal/Power Combo", SAMTEC Power Strip 25, 2008, 1 page.

"FCN-RTU Low Power Autonomous Controller Hardware", STARDOM FCN-RTU, Yokogawa Electric Corporation, Dec. 2008, 13 pages.

"ControlWave Micro Process Automation Controller", Instruction Manual, Emerson Process Management, Jun. 2013, 170 pages.

* cited by examiner

REMOTE TERMINAL UNIT (RTU) WITH UNIVERSAL INPUT/OUTPUT (UIO) AND RELATED METHOD

TECHNICAL FIELD

This disclosure relates generally to industrial process control and automation systems. More specifically, this disclosure relates to a remote terminal unit (RTU) with universal input/output (UIO) and related method.

BACKGROUND

A remote terminal unit (RTU) represents a device or system that provides localized control and data access at a site that is remote from a supervisory control and data acquisition (SCADA) system or other automation system. For example, multiple RTUs can be used at different sites and for different purposes in an oil and gas field. The RTUs can collect data, perform local control, record historical values using sensors and actuators at different sites (such as wells, pipelines, and compression stations), and provide live and historical data to a SCADA system. The SCADA system can execute control logic and alter the operations of actuators at the different sites via the RTUs. The RTUs themselves could also incorporate algorithms for data analytics.

In general, RTUs have increased in usage and complexity from their early designs in the 1970s. Today, RTUs often need to support a large set of application-specific network capabilities and protocols, as well as support a number of control execution models and provide smart device integration.

SUMMARY

This disclosure provides a remote terminal unit (RTU) with universal input/output (UIO) and related method.

In a first embodiment, an apparatus includes a remote terminal unit (RTU). The RTU includes input/output (I/O) terminals configured to be coupled to at least one industrial control and automation field device. The RTU also includes one or more I/O modules having one or more reconfigurable I/O channels configured to be coupled to the I/O terminals. Each reconfigurable I/O channel is configurable as an analog input, an analog input supporting digital communication, an analog output, an analog output supporting digital communication, a digital input, a digital output, and a pulse accumulator input. The RTU further includes at least one processing device configured to control a configuration of each of the one or more reconfigurable I/O channels.

In a second embodiment, a system includes at least one industrial control and automation field device and a remote terminal unit (RTU). The RTU includes input/output (I/O) terminals configured to be coupled to the at least one field device. The RTU also includes one or more I/O modules having one or more reconfigurable I/O channels configured to be coupled to the I/O terminals. Each reconfigurable I/O channel is configurable as an analog input, an analog input supporting digital communication, an analog output, an analog output supporting digital communication, a digital input, a digital output, and a pulse accumulator input. The RTU further includes at least one processing device configured to control a configuration of each of the one or more reconfigurable I/O channels.

In a third embodiment, a method includes coupling at least one industrial control and automation field device to input/output (I/O) terminals of a remote terminal unit (RTU). The method also includes, using at least one processing device, configuring one or more reconfigurable I/O channels that are coupled to the I/O terminals in one or more I/O modules of the RTU. Each reconfigurable I/O channel is configurable as an analog input, an analog input supporting digital communication, an analog output, an analog output supporting digital communication, a digital input, a digital output, and a pulse accumulator input.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, remote terminal units (RTUs) have increased in complexity from their early designs, and current RTUs often need to support a number of more advanced features. One feature often needed in an RTU is the ability to support a flexible mix of input/output (I/O) channel types. The channel types can include analog inputs (AIs), analog outputs (AOs), digital inputs (DIs), digital outputs (DOs), and pulse accumulator inputs (PIs). The AIs and AOs may or may not support digital communications, such as digital communications over 4-20 mA connections compliant with the HIGHWAY ADDRESSABLE REMOTE TRANSDUCER (HART) protocol. Conventional RTUs often achieve a desired mix of I/O channel types using I/O cards that have a fixed number of inputs and outputs, where each input or output is fixed to a particular type.

This disclosure describes an RTU having universal I/O channels with flexible user-defined I/O types. That is, each I/O channel can be configured as an AI (with or without digital communication), AO (with or without digital communication), DI, DO, or PI type via programming of the RTU. This allows the RTU to be installed in the field without having to first ensure that the appropriate I/O channels are physically inserted into the RTU. Once installed in the field, configurable late-binding terminations can be defined for the RTU. Among other things, this can help to reduce the size, power consumption, and cost of the RTU.

Figure 1:
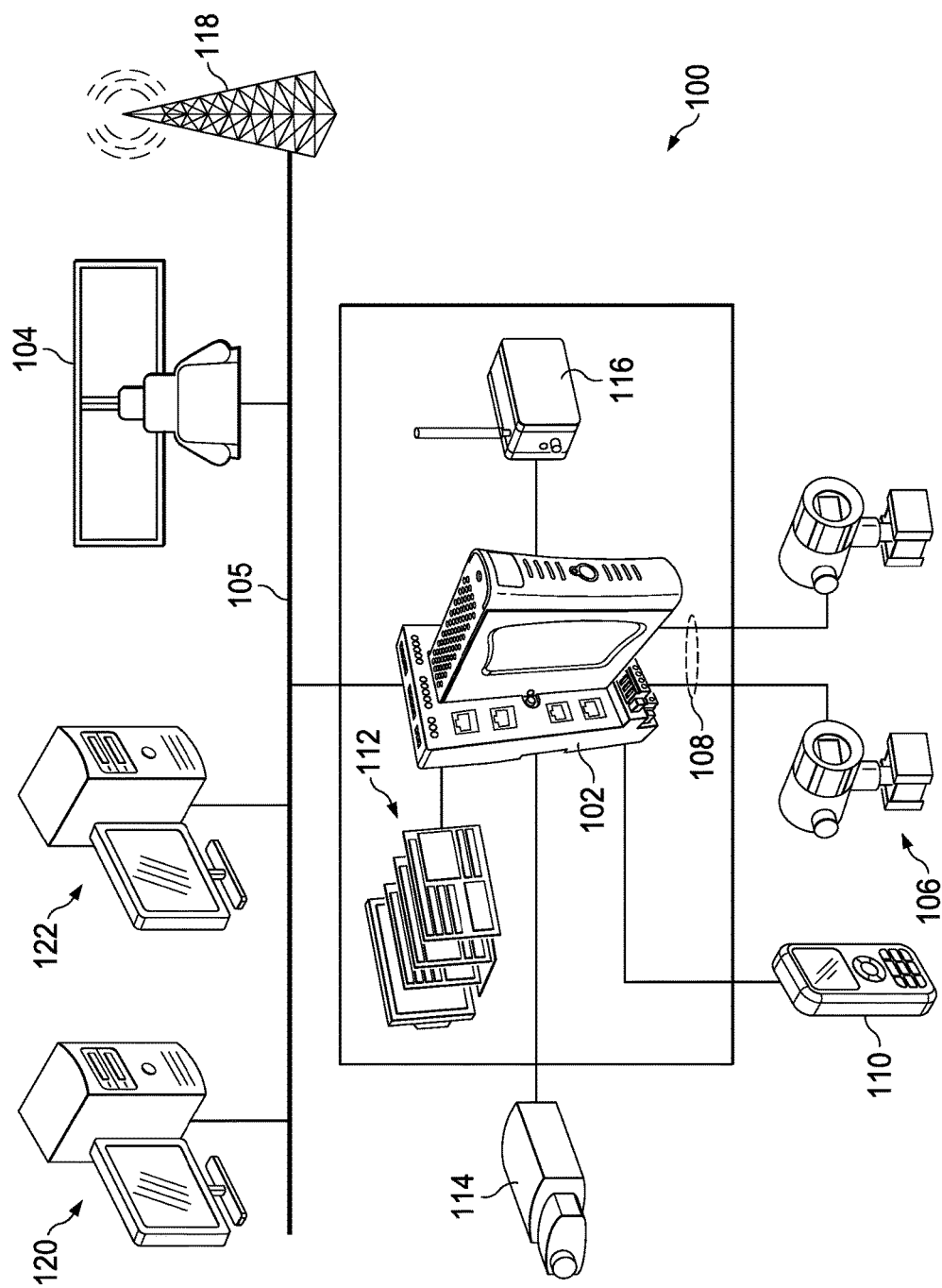
FIG. 1 illustrates an example industrial control and automation system having a remote terminal unit (RTU) according to this disclosure.

FIG. 1 illustrates an example industrial control and automation system 100 having an RTU 102 according to this disclosure. Note that the RTU 102 may also be referred to in the art as a remote telemetry unit. Also note that while a single RTU 102 is shown here, the system 100 could include any number of RTUs 102 distributed in one or more geographical areas.

The RTU 102 represents a device or system that provides localized control and data access at a site that is remote from a supervisory control and data acquisition (SCADA) system or other control system 104. For example, the RTU 102 could be positioned at or near an oil, gas, or water well or power substation. In these or other situations, the RTU 102 can be used to collect data from local sensors and process the data to generate control signals for local actuators. The RTU 102 can also interact with the control system 104 as needed. In this way, process control and automation functions can be provided at locations remote from the control system 104. The control system 104 is shown as communicating with the RTU 102 over a wired network 105 and using wireless connections, such as via microwave, cellular, or other radio frequency (RF) communications. However, the RTU 102 could communicate with the control system 104 over any suitable wired or wireless connection(s). In some embodiments, the components 102-104 could ordinarily communicate using a wired connection, with wireless communications used as backup.

The RTU 102 also communicates and interacts with one or more industrial field devices 106. The field devices 106 could include sensors that measure one or more characteristics of a process, actuators that alter one or more characteristics of a process, or other industrial field devices. In this example, the RTU 102 uses wired connections 108 to communicate with the field devices 106. The wired connections 108 could include serial connections (such as RS232 or RS485 connections), Ethernet connections, industrial protocol connections, or other wired connections. Note, however, that the RTU 102 could also communicate wirelessly with one or more field devices 106.

The RTU 102 in this example also communicates and interacts with at least one local user device 110. The user device 110 could be used by personnel to interact with the RTU 102 or with the field devices 106 or the control system 104 communicating with the RTU 102. The user device 110 includes any suitable structure supporting user interaction with an RTU.

Various other components could optionally be used with the RTU 102. For example, the RTU 102 could interact with one or more human-machine interfaces (HMIs) 112, such as display screens or operator consoles. The HMIs 112 can be used to receive data from or provide data to the RTU 102. One or more security cameras 114 (such as Internet Protocol cameras) could be used to capture still or video images and to provide the images to a remote location (such as a security center) via the RTU 102. A wireless radio 116 could be used to support wireless communications between the RTU 102 and a remote access point 118, which communicates with the control system 104 or other remote systems via the network 105. The other remote systems can include a field device manager (FDM) 120 or other asset manager and/or an RTU builder 122. The FDM 120 can be used to configure and manage assets such as field devices (including the field devices 106), and the RTU builder 122 can be used to configure and manage RTUs (including the RTU 102).

As described in more detail below, the RTU 102 incorporates one or more universal input/output (UIO) channels, where each I/O channel can be configured as an AI (with or without digital communication), AO (with or without digital communication), DI, DO, or PI type of channel. In this way, there is no need to use different I/O cards with different combinations of I/O channels in the RTU 102. Rather, each I/O channel can be configured as needed to be of the appropriate I/O type. Moreover, the RTU 102 can be expandable so that one or more I/O modules (each with one or more universal I/O channels) can be used with the RTU 102. Note, however, that it is also possible to use one or more reconfigurable I/O channels along with one or more fixed (non-reconfigurable) types of I/O channels in the RTU 102. For instance, the RTU 102 could include one or more fixed I/O channels, and the RTU 102 could be expanded to include one or more reconfigurable I/O channels.

In some embodiments, the universal I/O functionality of the RTU 102 can have one, some, or all of the following features:

Support for low-power operation in the RTU 102 (such as from 1.8 W to 4 W) to support "solar powered with battery backup" operations;
Support for extended temperature ranges, such as from −40° C. to +75° C.;
Support for expansion so that a configurable number of I/O channels can be used with the RTU 102;
Support for a variety of control execution methods in the RTU 102, such as function block, ladder logic, user structured text and programming, and sequence operations;
Support for two-, three-, or four-wire analog inputs and outputs for both field- and device-powered transmitters and smart valve positioners;
Support for other I/O types without restriction in terms of mix, including AI, AI with digital communication, AO, AO with digital communication, DI (including digital input sequence of event or "DI-SOE" inputs), DO, and PI;
Support for RTU control module redundancy; and
Support for RTU pricing, which is lower than conventional distributed control system (DCS) devices.

Although FIG. 1 illustrates one example of an industrial control and automation system 100 having an RTU 102, various changes may be made to FIG. 1. For example, the system 100 could include any number of each component. Also, the functional division shown in FIG. 1 is for illustration only. Various components in FIGURE could be combined, subdivided, or omitted and additional components could be added according to particular needs. Further, while shown as being used with wired field devices, the RTU 102 could be used with only wireless field devices or with both wired and wireless field devices. In addition, FIG. 1 illustrates one example operational environment where an RTU 102 with one or more universal I/O channels can be used. One or more RTUs could be used in any other suitable system.

FIGS. 2 through 9 illustrate details of an example RTU 102 according to this disclosure. For ease of explanation, the RTU 102 is described as being used in the system 100 of FIG. 1. However, the RTU 102 could be used in any other suitable system.

Figure 2:
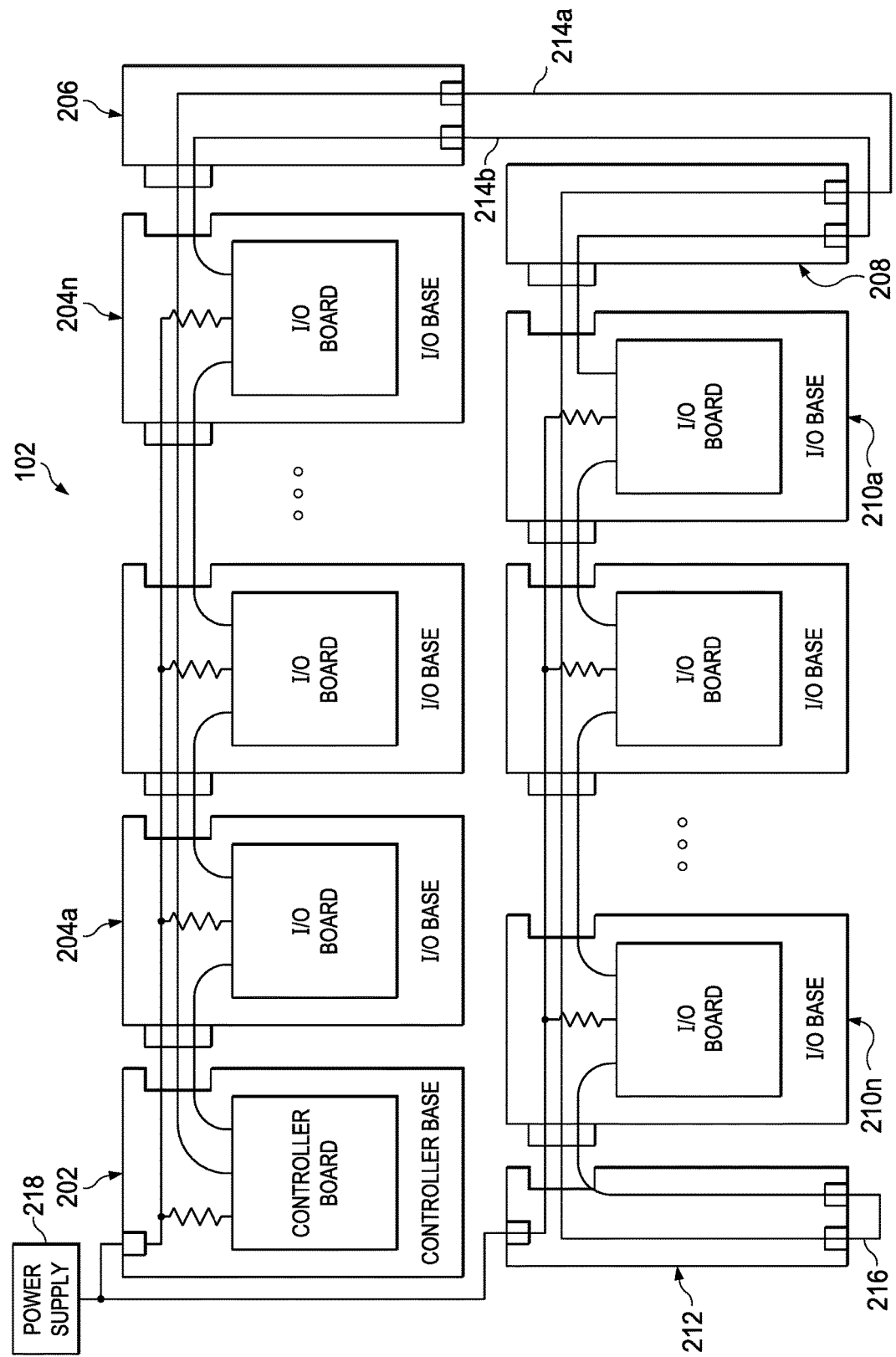
FIGS. 2 through 9 illustrate details of an example RTU according to this disclosure.

As shown in FIG. 2, the RTU 102 includes a controller module 202, a first set of I/O modules 204a-204n, and an expansion board 206. The controller module 202 represents the module that executes control logic and other functions of the RTU 102. For example, the controller module 202 could execute control logic that analyzes sensor data and generates control signals for actuators. The controller module 202 could also execute functions that control the overall operation of the RTU 102, such as functions supporting communications with external devices or systems. The controller module 202 includes any suitable structure for controlling one or more operations of an RTU. In some embodiments, the controller module 202 includes at least one processing device that executes a LINUX or other operating system.

At least one of the I/O modules 204a-204n could support at least one configurable I/O channel. Data can be transported between the controller module 202 and external devices or systems (such as the field devices 106) via the I/O channels of the I/O modules 204a-204n. Each I/O module 204a-204n includes circuitry supporting the use of one or more I/O channels. If an I/O module supports the use of one or more reconfigurable I/O channels, the I/O module 204a-204n also includes circuitry that configures at least one I/O channel as an AI (with or without digital communication), AO (with or without digital communication), DI, DO, or PI channel. The circuitry can be used to configure and reconfigure each I/O channel as desired. For instance, example types of reconfigurable I/O channels are shown in U.S. Pat. Nos. 8,072,098; 8,392,626; and 8,656,065 (all of which are hereby incorporated by reference in their entirety). The RTU 102 can include any number of I/O modules 204a-204n. In some embodiments, a specified number of I/O modules 204a-204n (such as eight modules) can be built into the RTU 102.

The expansion board 206 allows the RTU 102 to be coupled to an expansion board 208, which is coupled to a second set of I/O modules 210a-210n. The I/O modules 210a-210n could have the same or similar structure as the I/O modules 204a-204n, and any number of I/O modules 210a-210n could be used in the second set (such as eight modules). An expansion board 212 can be used to couple to a third set of I/O modules. Additional I/O modules can be added in a similar manner.

Note that, as described above, the RTU 102 could include a combination of fixed I/O channels and reconfigurable I/O channels. The fixed I/O channels could be supported by any of the I/O modules 204a-204n, 210a-210n in the RTU 102, and the reconfigurable I/O channels could be supported by any of the I/O modules 204a-204n, 210a-210n in the RTU 102. As a particular example, the I/O modules 204a-204n could support fixed type(s) of I/O channels, while the I/O modules 210a-210n could support reconfigurable I/O channels. However, any other suitable combination of fixed and reconfigurable I/O channels could be used in the RTU 102.

Each expansion board 206, 208, 212 includes any suitable structure facilitating the addition of one or more I/O modules to an RTU. In this example, two electrical paths 214a-214b are formed through the RTU 102, and the electrical paths 214a-214b meet at a loop 216. The electrical paths 214a-214b could be formed in any suitable manner, such as by using Ethernet connections and electrical paths through the I/O modules and expansion boards. The loop 216 can be used to indicate that no additional I/O modules are presently connected to the RTU 102. Note, however, that the loop 216 could also be placed on the expansion board 206 to indicate that no additional sets of I/O modules are currently connected to the RTU 102.

A power supply (PS) 218 provides operating power to the components of the RTU 102. The power supply 218 includes any suitable structure(s) configured to provide operating power to an RTU. For example, the power supply 218 could include one or more batteries, solar panels, fuel cells, or other source(s) of power.

In some embodiments, the controller module 202 receives runtime and diagnostic data from one or more field devices 106 via one or more I/O modules, such as the I/O modules 204a-204n, 210a-210n. The controller module 202 can provide the runtime data and historical data (which could be stored in the controller module 202 or other location) to the control system 104. The controller module 202 can also provide the diagnostic data to the FDM 120.

In particular embodiments, the controller module 202 executes a LINUX operating system, supports communication with the control system 104 using a MODBUS or DNP3 protocol, and communicates with the FDM 120 using a HART OVER IP (HART-IP) protocol. Also, the International Electrotechnical Commission (IEC) 61131 standard can be supported by the controller module 202 for programming the RTU 102.

Figure 3:
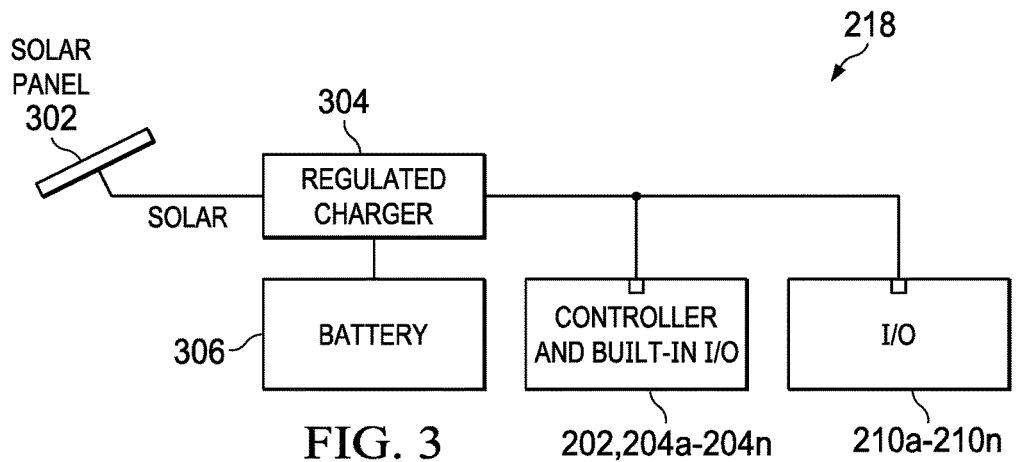

FIG. 3 illustrates an example power supply 218 that could be used with the RTU 102. As shown in FIG. 3, the power supply 218 includes at least one solar panel 302, a regulated charger 304, and at least one battery 306. Each solar panel 302 includes any suitable structure for converting solar energy into electrical energy. In some embodiments, one or more solar panels 302 generate a direct current (DC) voltage of between 10-30 VDC.

The regulated charger 304 converts electrical energy into a form suitable for use by components of the RTU 102. For example, the regulated charger 304 could convert the 10-30 VDC signal from the solar panel(s) 302 into a 24 VDC signal for the controller module 202 and the I/O modules 204a-204n (as well as any additional I/O modules, such as I/O modules 210a-210n). The regulated charger 304 also provides electrical energy from the solar panel(s) 302 to the one or more batteries 306 for charging of the batteries 306. The regulated charger 304 can further provide electrical energy from the one or more batteries 306 to the components of the RTU 102 to supplement or replace electrical energy from the solar panel(s) 302. This could occur, for instance, during times when the solar panel(s) 302 cannot generate adequate power (such as at night or during bad weather).

Figure 4B:
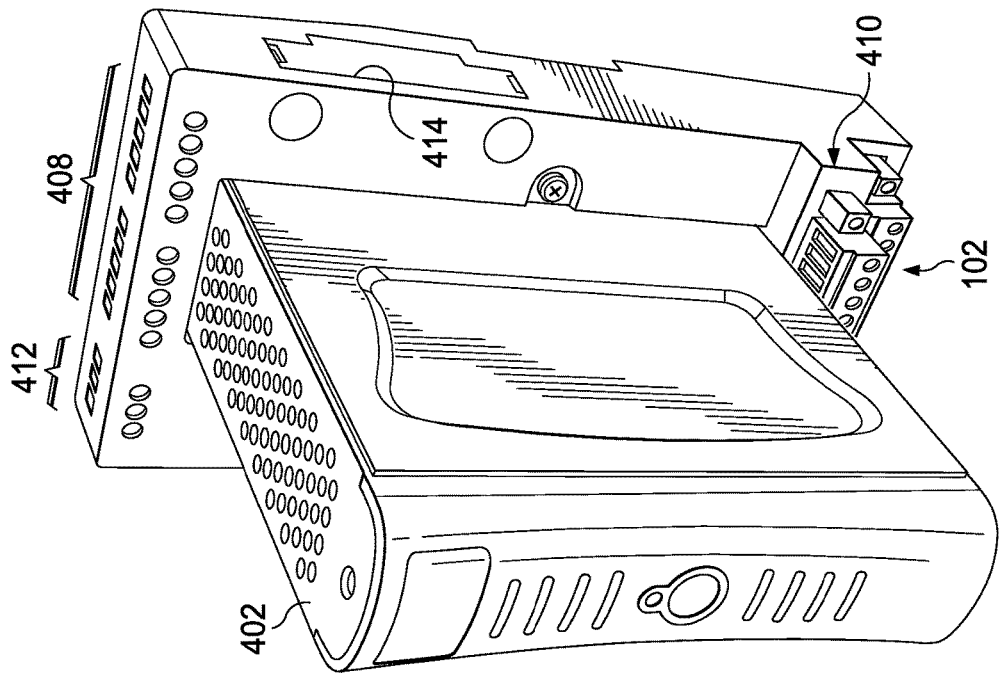
Figure 4A:
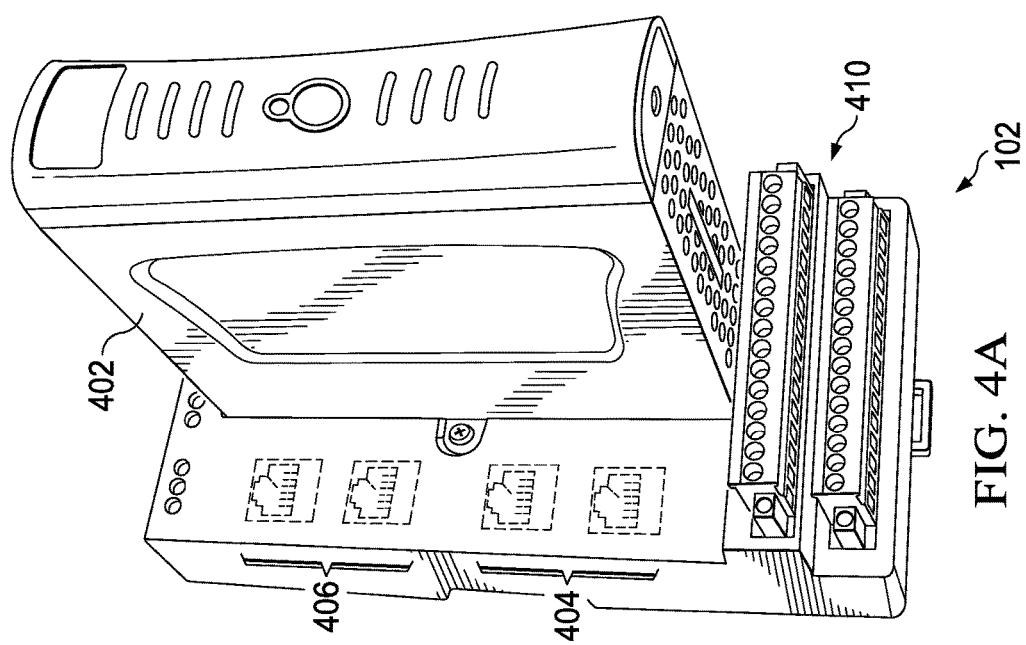
Figure 4C:
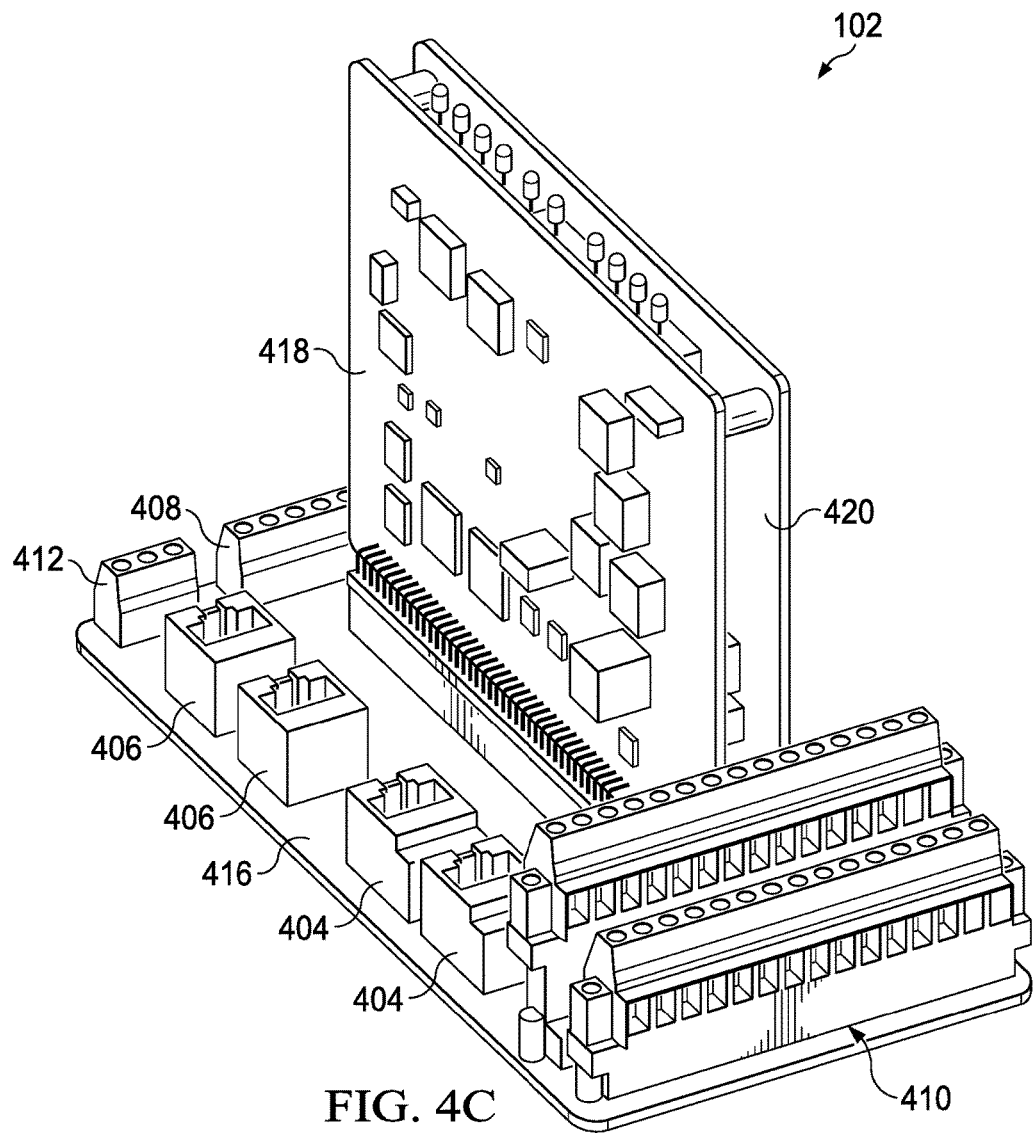

FIGS. 4A through 4C illustrate additional details regarding the example RTU 102. A housing 402 is used to encase and protect other components of the RTU 102. The housing 402 also provides access to various other components of the RTU 102, such as one or more ports or terminals. The housing 402 can have any suitable size, shape, and dimensions and be formed from any suitable material(s) (such as metal or ruggedized plastic).

The RTU 102 also includes two uplink/downlink ports 404, two RS232 ports 406, and two RS485 ports 408. The ports 404 can be used to couple the RTU 102 to higher-level or lower-level devices, such as the control system 104, FDM 120, or RTU builder 122 via the network 105. The ports 404 could represent any suitable structures for coupling to one or more communication links, such as Ethernet ports. The RS232 ports 406 and the RS485 ports 408 could be used to couple the RTU 102 to one or more field devices or other devices that use the RS232 or RS485 serial protocol.

Various I/O terminals 410 are also used to couple the RTU 102 to one or more field devices. The I/O terminals 410 here can be coupled to the I/O modules 204a-204n and thereby provide a communication path between the I/O modules 204a-204n and the field device(s) coupled to the I/O terminals 410. The I/O terminals 410 can be coupled to various types of field devices, and the I/O modules 204a-204n can be configured appropriately as AI (with or without digital communication), AO (with or without digital communication), DI, DO, and/or PI channels. The I/O terminals 410 include any suitable structures for coupling to different communication paths, such as screw terminals.

A power terminal 412 can be used to couple the RTU 102 to a power supply, such as the power supply 218. A slot 414 provides access to additional connectors, such as the expansion board 206 for coupling to the I/O modules 210a-210n.

Note that the numbers and types of ports and terminals shown in FIGS. 4A through 4C are for illustration only. The RTU 102 could include any suitable type(s) and number(s) of interfaces as needed or desired.

As shown in FIG. 4C, the RTU 102 further includes three printed circuit boards (PCBs). A first circuit board 416 represents the substrate on which the ports 404-408, I/O terminals 410, and other input/output components can be located. The circuit board 416 represents any suitable substrate, such as an Input Output Termination Assembly (IOTA) board. For this reason, the circuit board 416 may be referred to below as the IOTA board 416.

A second circuit board 418 and a third circuit board 420 are coupled to the IOTA circuit board 416. The second circuit board 418 represents a board having at least one processing device that executes an operating system for the RTU 102. For this reason, the circuit board 418 may be referred to below as the kernel board 418. The circuit board 418 could also include at least one memory, a power supply or power converter, and one or more communication interfaces. As a particular example, the circuit board 418 could include a field programmable gate array (FPGA).

The third circuit board 420 represents an application board that contains I/O modules, such as the I/O modules 204a-204n. The circuitry on the circuit board 420 can be used to reconfigure an I/O channel into an AI (with or without digital communication), AO (with or without digital communication), DI, DO, or PI channel. As a particular example, the circuit board 420 could include an application specific integrated circuit (ASIC) that includes the switches and other components used to provide reconfigurable I/O channels. For this reason, the circuit board 420 may be referred to below as the application board 420.

Figure 5:
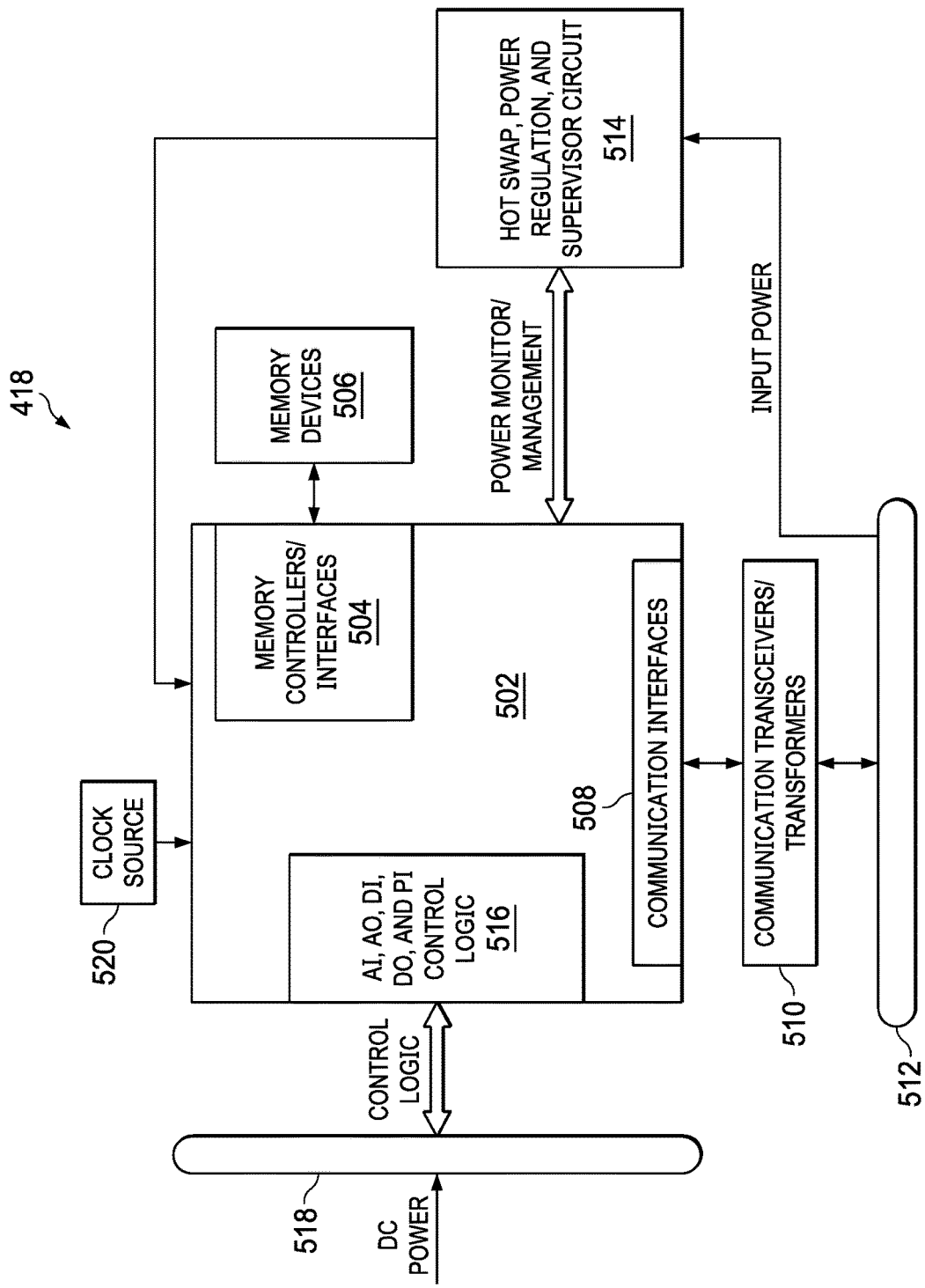

FIG. 5 illustrates an example of the kernel board 418 in the RTU 102. As shown in FIG. 5, the kernel board 418 includes at least one processing device 502. The processing device(s) 502 can execute an operating system and otherwise perform various operations to support the functions of the controller module 202. Each processing device 502 includes any suitable processing or computing device, such as a microprocessor, microcontroller, digital signal processor, FPGA, ASIC, or discrete logic devices. In particular embodiments, the processing device 502 represents a XILINX ZYNQ-7000 Extensible Processing Platform (EPP).

The processing device(s) 502 can include or otherwise support one or more memory interfaces/controllers 504, which could be used to support data transfers to and from one or more memory devices 506. Any suitable memory interfaces/controllers 504 could be used in the RTU 102, such as one or more serial peripheral interfaces (SPIs), double data rate (DDR) interfaces, secure digital input output (SDIO) interfaces, or inter-integrated circuit (I²C) controllers. Similarly, any suitable memory devices 506 could be used in the RTU 102, such as one or more Flash memories; DDR3, magnetoresistive, or other random access memories; secure digital (SD) cards; or electrically erasable programmable read only memories or other read only memories. At least one of the memory devices 506 could be used to store data during power losses by the RTU 102 so that the data can be retrieved when power is restored to the RTU 102.

The processing device(s) 502 can also include or otherwise support one or more communication interfaces 508, which could be used to support data transfers to and from one or more communication transceivers/transformers 510. Any suitable communication interfaces 508 could be used in the RTU 102, such as one or more SPIs, universal asynchronous receiver/transmitter (UART) interfaces, or reduced media independent interfaces (RMIIs). Also, any suitable communication transceivers/transformers 510 could be used in the RTU 102, such as one or more Ethernet switches, Ethernet transceivers, RS232 transceivers, or RS485 transceivers. A connector 512 couples the kernel board 418 to the IOTA board 416. Among other things, the communication transceivers/transformers 510 can communicate with the IOTA board 416 via the connector 512. The connector 512 includes any suitable structure configured to transport signals between circuit boards.

Circuitry 514 receives input power from the IOTA board 416 via the connector 512. The circuitry 514 provides various functions, such as hot swap, power regulation, and supervisory functions. As a particular example, the circuitry 514 could receive a 24 VDC signal as input power and convert the input power into one or more other forms. For instance, the circuitry 514 could convert a 24 VDC input power into 1.8 VDC, 3.3 VDC, and 5 VDC signals. The circuitry 514 can also exchange power monitoring and management information with the processing device 502. This allows, for example, the processing device 502 to perform or trigger functions during over-voltage or under-voltage conditions.

The processing device(s) 502 can further include or otherwise support control logic 516 for controlling the configuration of universal I/O channels, such as channels in the I/O modules 204a-204n, 210a-210n. For example, the control logic 516 can provide control signals that configure different circuits in the I/O modules 204a-204n, 210a-210n in order to configure the I/O channels appropriately. A connector 518 couples the kernel board 418 to the application board 420, which allows the control logic 516 to provide configuration signals to the application board 420. The connector 518 also allows the circuitry 514 to provide DC power to the application board 420. The connector 518 includes any suitable structure configured to transport signals between circuit boards.

A clock source 520 is used to provide one or more clock signals to the processing device(s) 502. The clock source 520 includes any suitable source of one or more clock signals, such as a local oscillator.

Figure 6A:
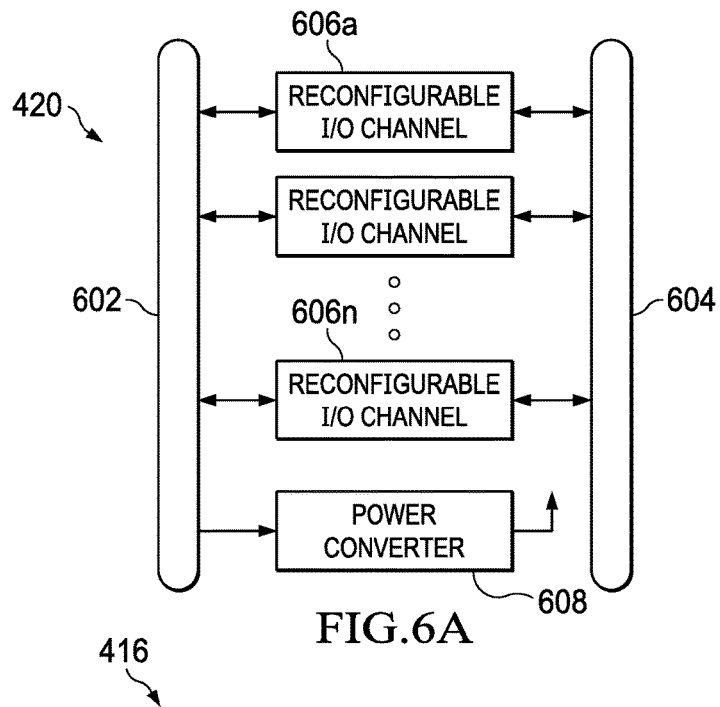
Figure 6B:
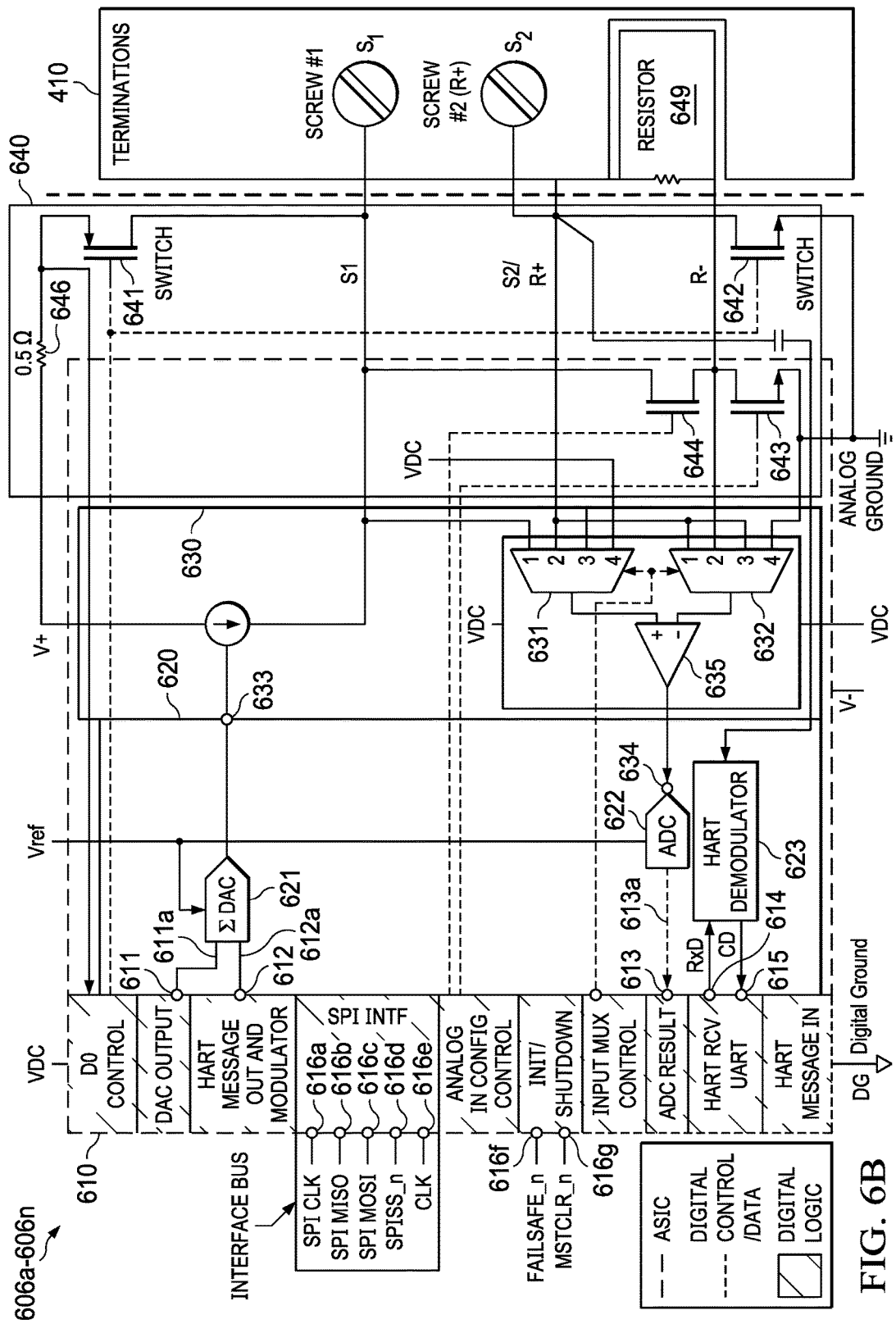

FIGS. 6A and 6B illustrate an example of the application board 420 in the RTU 102. The application board 420 generally includes the data acquisition and output control circuits for the RTU 102. As shown in FIG. 6A, the application board 420 includes a connector 602 that couples the application board 420 to the kernel board 418. The application board 420 also includes a connector 604 that couples the application board 420 to the IOTA board 416. Each connector 602-604 includes any suitable structure configured to transport signals between circuit boards.

The application board 420 further includes multiple reconfigurable I/O channels 606a-606n. The I/O channels 606a-606n here could represent or form at least a part of one or more I/O modules 204a-204n in the RTU 102. Each I/O channel 606a-606n can be configured to operate as an AI (with or without digital communication), AO (with or without digital communication), DI, DO, or PI channel. One example implementation of the reconfigurable I/O channels 606a-606n is shown in FIG. 6B, which is described below. However, other implementations of the reconfigurable I/O channels 606a-606n can also be used.

In this example, there is no power regulator in the application board 420, and power is received from the kernel board 418 via the connector 602 (although this need not be the case). A power converter 608 can be used to convert the power received from the kernel board 418. For example, the power converter 608 could include a boost converter that boosts a voltage received from the kernel board 418, such as from 5 VDC to 6 VDC.

As shown in FIG. 6B, the signal mode for an I/O channel 606a-606n can be electronically configurable via control signals, such as control signals from the control logic 516 in the kernel board 418. The I/O channel 606a-606n is coupled to two terminal screws S1 and S2, which can form part of the I/O terminals 410.

The I/O channel 606a-606n includes a digital logic block 610 having a plurality of terminals, including terminals 616a-616g configured to receive control signals. The digital logic block 610 also includes terminals 611-612 for providing a plurality of logic signals 611a-612a to a current output digital-to-analog converter (DAC) 621 provided in an analog common resource block 620. The current output DAC 621 represents a variable current source. The analog common resource block 620 also includes an analog-to-digital converter (ADC) 622. Either or both of the current output DAC 621 and the ADC 622 of the analog common resource block 620 may be optionally shared by multiple ones of the I/O channels 606a-606n.

The analog common resource block 620 also includes a demodulator shown as a HART demodulator 623, which is shown as being configured to utilize the HART communication protocol. Other communication protocols may also be used. Terminals 616a-616d of the digital logic block 610 are associated with a communication bus, which in this example represents an SPI bus. However, other bus interfaces may be used, including parallel interface buses.

The digital logic block 610 also includes at least a first processed data terminal 613 for receiving processed signal data 613a from the ADC 622. As shown in FIG. 6B, the HART demodulator 623 receives data (RxD) from a terminal 614 of the digital logic block 610 and provides demodulated data (CD) to a terminal 615 of the digital logic block 610.

The analog common resource block 620 is coupled to an analog MUX block 630. The MUX block 630 includes an input 633 for receiving current from the current output DAC 621 and an output 634 for providing voltage signals to an input of the ADC 622. As shown in FIG. 6B, the MUX block 630 includes a MUX 631 and a MUX 632, which have their outputs coupled to respective inputs of an operational amplifier (op amp) 635. The output of the op amp 635 is coupled to an input of the ADC 622.

An output circuit block 640 is coupled to the I/O terminals 410. The I/O terminals 410 include the terminal screws S1 and S2, and each I/O channel 606a-606n can be coupled to its own set of terminal screws in the I/O terminals 410. The output circuit block 640 includes a sense resistor 649. In FIG. 6B, the resistor 649 has a high potential side R+ and a low potential side R−. The variable current source provided by the current output DAC 621 is coupled to S1, R+ of the resistor 649 is coupled to S2, and R− of the resistor 649 is coupled to input #2 of the MUX 632. The resistor 649 can be a precision resistor, such as a low temperature coefficient of resistance (TCR) resistor. The output circuit block 640 also includes a sense resistor (SR) 646, which is shown in this example as being a 0.5Ω resistor and which is coupled in series with a DC power supply (V+) provided to the MUX block 630 and the output circuit block 640.

As shown in FIG. 6B, power transistors of the output circuit block 640 are all shown as power metal oxide semiconductor field-effect transistors (MOSFETs). The power transistors include a FET 641 coupled between SR 646 and S1, a FET 642 coupled between S2 and an analog ground, a FET 643 coupled between R− and the analog ground, and a FET 644 coupled between S1 and R−. However, bipolar-based power transistors may also be used.

In one aspect of operation, the FET 643 is in either an ON or OFF state based on the logic signal from the digital logic block 610, which determines whether the analog ground will be used by the I/O channel 606a-606n. The ON or OFF state of the FET 643 thus determines if a field device 106 is going to be connected to the analog ground (yes if the FET 643 is ON, no if the FET 643 is OFF). Even if the FET 643 is OFF, the analog ground generally has some role in the function of the I/O channel 606a-606n. For example, all of the signal modes provided by the I/O channel 606a-606n utilize the current output DAC 621 for signaling a field device 106 and utilize the first and second MUX 631-632, op amp 635, and ADC 622 for signals received from the field device 106.

In this embodiment, the I/O channel 606a-606n responds to voltage. If the field device is of a voltage type, the resistor 649 is not needed. If the field device is of a current type, a voltage is developed by directing that current across the resistor 649, which could represent a 100Q to 300Q resistor. The DAC 621 is always OFF when the field device has its own power.

In some embodiments, one or multiple I/O channels 606a-606n can be realized in large part as a mixed-signal ASIC, with the ASIC providing the digital logic block 610, analog common resource block 620, and MUX block 630 for the I/O channel(s) 606a-606n. The output circuit block 640 for the I/O channel(s) 606a-606n can be realized using printed circuit board (PCB) technology by mounting discrete devices thereon.

The following represents several examples of how the I/O channel 606a-606n of FIG. 6B can be reconfigured. These examples do not limit the scope or content of this disclosure. In the following examples, "A" though "E" refer to operating states for various devices in the I/O channel 606a-606n, which are controlled by logic signals from the digital logic block 610. "A" refers to MUX 631, and "B" refers to MUX 632. The values "C," "D," and "E" (for FETs 643, 641, and 644, respectively) and the DAC 621 should remain at the values that are appropriate for the intended use-case.

Function/Case 1: AI from a field device 106 that needs power from the I/O channel 606a-606n (typically via a 0-20 mA current loop)

| Function | A | B | C | D | E | DAC |
|---|---|---|---|---|---|---|
| AI Normal 4-20 mA (LM and no LM) | 2 | 2 | ON | OFF | OFF | 25 mA |

In this case, the DAC 621 is set to its maximum output, effectively acting as a 24V source (for a V+ level of 24V) with a 25 mA current limit. A field device 106 connected between screws S1 and S2 varies the current passing through it to indicate the value of a parameter the field device 106 is measuring (such as temperature, pressure, or level). Via S2, the modulated current passes through the resistor 649, developing a voltage responsive to the modulated current that is measured by the ADC 622 via MUXs 631, 632 on path #2. A user can configure line monitoring (LM) as an option. When configured, a broken wire (broken line) is identified if the ADC 622 conversion reflects the absence of current to/through the field device 106.

Function/Case 2: AI from a field device 106 that provides its own current and is referenced to the I/O channel 606a-606n (typically via a 0-20 mA current loop)

| Function | A | B | C | D | E | DAC |
|---|---|---|---|---|---|---|
| AI 4-20 mA (self powered) (LM and no LM) | 3 | 3' | ON | OFF | ON | 0 mA |

In this case, the field device 106 produces a current between 0-20 mA. This current enters the I/O channel 606a-606n on pin S1 and is routed through the FET 644 and then to the resistor 649. The current returns to the field device 106 via S2. The MUXs 631 and 632 pass the voltage across the resistor 649 to the ADC 622 using multiplexer path #3 (which has the effect of correcting for the inverted voltage). A user can configure LM as an option. In this case, the analog circuitry of the filed device 106 is referenced to the same ground as the I/O channel 606a-606n (the FET 643 is ON). The use of HART can also be supported.

Function/Case 3: AI from a field device 106 that provides its own current and may be referenced to a voltage/ground different than that of the I/O channel 606a-606n (typically via a 0-20 mA current loop)

| Function | A | B | C | D | E | DAC |
|---|---|---|---|---|---|---|
| AI 4-20 mA (self powered) (LM and no LM) foreign ground | 3 | 3 | OFF | OFF | ON | 0 mA |

In this case, the field device 106 produces a current between 0-20 mA. The current enters the I/O channel 606a-606n on pin S1 and is routed through the FET 644 to the resistor 649, and the current returns to the field device 106 via S2. The MUXs 631, 632 pass the voltage across the resistor 649 to the ADC 622 using MUX path #3 (which has the effect of correcting for the inverted voltage). The user can configure LM as an option. Here, the field device 106 can be referenced to a ground different from that of the I/O channel 606a-606n. One goal could be that either or both screws signals S1 and S2 can be 12V (maximum) to −7V (minimum) with respect to the analog ground of the I/O channel 606a-606n. The use of HART can also be supported.

Function/Case 4: AI from a field device 106 that presents a voltage (like a battery) and is referenced to the I/O channel 606a-606n (typically 0-5 VDC):

| Function | A | B | C | D | E | DAC |
|---|---|---|---|---|---|---|
| AI Voltage In | 1 | 1 | ON | OFF | OFF | 0 mA* |

In this case, the field device 106 produces a voltage between 0-10V. That voltage is presented to the I/O channel 606a-606n across pins S1 and S2. The MUXs 631, 632 pass the field device's voltage to the ADC 622 using MUX path #1. The user can configure LM as an option. For example, LM makes sense if the user is using a field device having a normal input voltage range that does not extend to 0V, such as a field device with a 1-5V output. Here, the analog value is referenced to the same analog ground as the I/O channel 606a-606n (the FET 643 is ON). The DAC 621 can have no contribution to the measurement of the voltage.

Function/Case 5: AI from a field device 106 that presents a voltage (like a battery) and may be referenced to a voltage/ground different than that of the I/O channel 606a-606n (typically 0-5 VDC)

| Function | A | B | C | D | E | DAC |
|---|---|---|---|---|---|---|
| AI Voltage In | 1 | 1 | OFF | OFF | OFF | 0 mA* |

This case is almost identical to Function/Case 4 except, in this case, the field device 106 can be referenced to a ground different from that of the I/O channel 606a-606n. Thus, the FET 643 is OFF. Again, the DAC 621 can have no contribution to the measurement of the voltage.

Function/Case 6: DI that needs power from the I/O channel 606a-606n (dry contact)

| Function | A | B | C | D | E | DAC |
|---|---|---|---|---|---|---|
| DI (Normal) (LM and no LM) | 2 | 2 | ON | OFF | OFF | 7 mA |

This case is almost identical to Function/Case 1. In this case, the DAC 621 produces 7 mA, and that current exits the I/O channel 606a-606n at pin S1. The current is used to sense the closure of a relay contact (of the field device 106). The return current enters from screw S2 and passes through the resistor 649. The MUXs 631, 632 pass the voltage across the resistor 649 to the ADC 622 using MUX path #2. The user can configure LM as an option, although discrete external resistors could be used to prevent a "false positive" when the relay contact of the field device 106 is open. Here, the dry contact is referenced to the same ground as the resistor 649 (the FET 643 is ON). The closure is detected as a normal ADC conversion, and the RTU 102 can have an algorithm to reduce the provided results from the ADC 622 to a single Boolean value. When it is determined that the relay of the filed device 106 has transitioned from OFF to ON, the DAC 621 can be commanded to reduce current to save power. When it is determined that the relay has transitioned from ON to OFF, the DAC 621 can be commanded to generate 7 mA to provide sufficient "wetting current" for the relay contact. Note that a similar approach can be used for a PI in which the processing device 502 or other component counts the number of pulses or transitions in a digital input signal.

Function/Case 7: DI that provides signals via its own power and may be referenced to a voltage/ground different than that of the I/O channel 606a-606n (a voltage input similar to a battery)

| Function | A | B | C | D | E | DAC |
|---|---|---|---|---|---|---|
| DI Voltage In (LM not supported) foreign ground | 1 | 1 | OFF | OFF | OFF | 0 mA |

This case is identical to Function/Case 3 with the exception that LM is not offered. Once again, the DAC 621 can have no contribution to the measurement of the voltage. Note that a similar approach can be used for a PI in which the processing device 502 or other component counts the number of pulses or transitions in a digital input signal.

Function/Case 8: AO (0-20 mA)

| Function | A | B | C | D | E | DAC |
|---|---|---|---|---|---|---|
| AO (LM and no LM) | 2 | 2 | ON | OFF | OFF | 0-20 mA |

In this case, the DAC 621 produces 0-20 mA, and the current exits the I/O channel 606a-606n at pin S1. The current is used to modulate an actuator (such as a valve positioner). The return current enters from pin S2 and passes through the resistor 649. The MUXs 631, 632 pass the voltage across the resistor 649 to the ADC 622 using MUX path #2. The user can configure LM as an option, such as when a field device 106 has a normal range of current with a minimum value greater than 0 mA. For example, a field device 106 with a normal current actuation range of 4-20 mA could be suitable for LM. It is noted that in this case, the use of LM can relate to the design of the I/O channel 606a-606n. Specifically, the I/O channel 606a-606n is able to maintain the AO value while performing an ADC conversion. It can save cost to implement the ADC 622 as using a Successive Approximation Register (SAR) approach with the DAC 621 feeding the comparison point. This is acceptable, but the AO current to the field device 106 could be maintained without interruption. In this case, the analog loop is referenced to the same ground as the I/O channel 606a-606n (the FET 643 is ON). The use of HART can also be supported. The commands to the I/O channel 606a-606n can command the FETs to be ON (to energize) or to be OFF (to de-energize).

Function/Case 9: DO

| Function | A | B | C | D | E | DAC |
|---|---|---|---|---|---|---|
| DO ON (no LM) | d.c. | d.c. | OFF | ON | OFF | 0 mA |
| DO OFF (LM) | 2 | 2 | ON | OFF | OFF | 0 mA, 1 mA |
| DO OFF (no LM) | d.c. | d.c. | OFF | OFF | OFF | 0 mA |

In this case the digital logic block 610 turns ON the FETs 641 and 642 to energize a load (such as a relay). The user can configure LM as an option. The case for the DO OFF works by passing a small current (such as 1 mA) through the load for a short time (sufficient for one ADC conversion). The MUXs 631, 632 pass the voltage across the resistor 649 to the ADC 622 using MUX path #2. In this case, the field device 106 is referenced to the same ground as the I/O channel 606a-606n, but the field device (load) current only enters the I/O channel 606a-606n when the DO is OFF and LM is configured (the FET 643 is ON).

Function/Case 10: A safe-state that cannot damage or energize a field device 106 that is mistakenly connected

| Function | A | B | C | D | E | DAC |
|---|---|---|---|---|---|---|
| Safe State | 2 | 2 | ON | OFF | OFF | 1 mA |

Here, the "safe state" can be entered upon initial power-on reset or when an external signal (such as from a watchdog timer) indicates a lack of health of surrounding circuits or the absence of a controller block (such as the controller module 202). In this case, the I/O channel 606a-606n is not is use, and no field device is expected to be connected. The I/O channel 606a-606n is configured similar to Function/Case 1, but with only 1 mA from the DAC 621. This supports a diagnostic mode that can detect the unintended presence of a field device 106.

Diagnostic Function/Case: 3V3 (Digital Vcc)

| Function | A | B | C | D | E | DAC |
|---|---|---|---|---|---|---|
| Safe State | 4 | 4 | * | * | * | * |

In this case, the ADC 622 measures 3V3. This is for I/O channel health/safety and does not relate to a user use-case. The MUXs 631, 632 pass the voltage to the ADC 622 using MUX path #4.

Note that these are but a few examples of how the I/O channel 606a-606n can be configured for use in the RTU 102. Other use cases could be supported by the I/O channels 606a-606n in the RTU 102. Also note that the RTU 102 could include any number of reconfigurable I/O channels 606a-606n.

Figure 7:
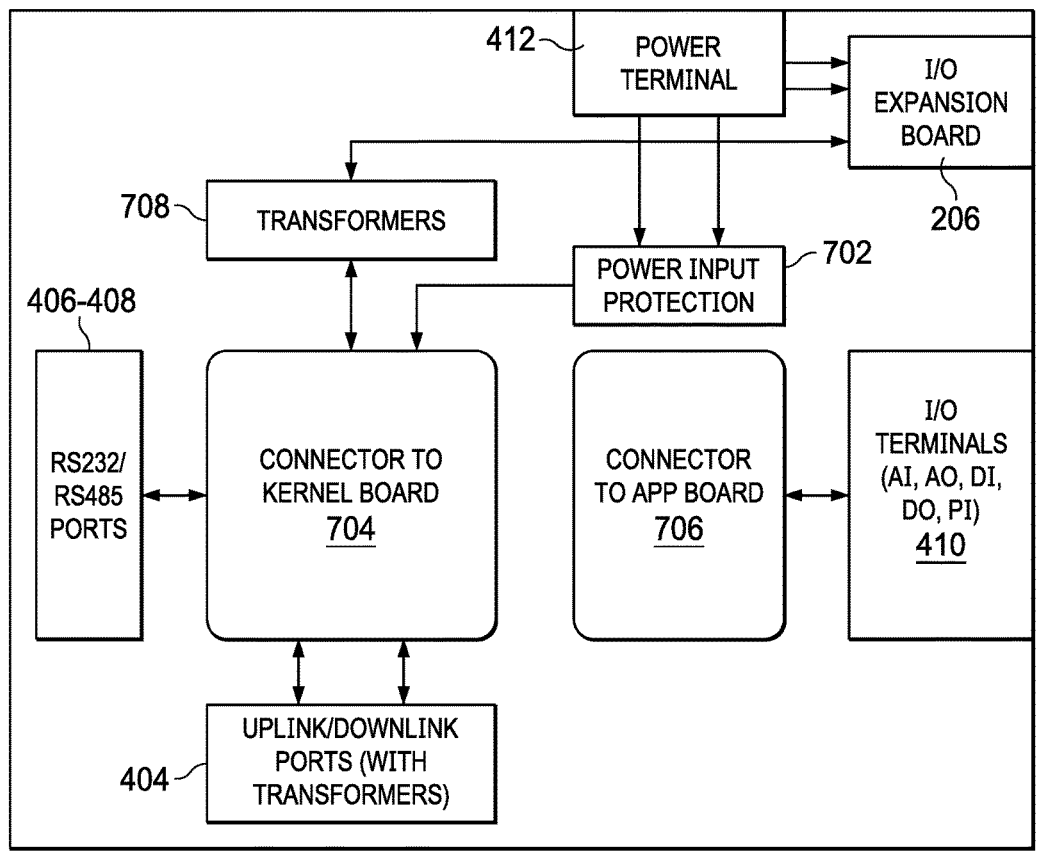

FIG. 7 illustrates an example IOTA board 416 in the RTU 102. As shown in FIG. 7, the IOTA board 416 includes the uplink/downlink ports 404, the RS232 and RS485 ports 406-408, the I/O terminals 410, and the power terminal 412 described above. The IOTA board 416 also includes the I/O expansion board 206 described above.

A power input protection circuit 702 receives power from the power terminal 412 and provides input power to the kernel board 418 via a connector 704. For example, the protection circuit 702 could provide over-voltage protection for the RTU 102. The protection circuit 702 includes any suitable structure(s) providing power protection. A connector 706 allows the application board 420 to be coupled to the I/O terminals 410. Each connector 704-706 includes any suitable structure configured to transport signals between circuit boards.

Transformers 708 are used to couple the I/O expansion board 206 to the kernel board 418 via the connector 704. This allows the control logic 516 in the kernel board 418 to properly configure and control additional I/O modules, such as I/O modules 210a-210n, coupled to the RTU 102. The transformers 708 include any suitable structures for helping to isolate the additional I/O modules from other components of the RTU 102. In some embodiments where Ethernet cables are used to form the electrical paths 214a-214b, the transformers 708 could represent Ethernet transformers.

Figure 8:
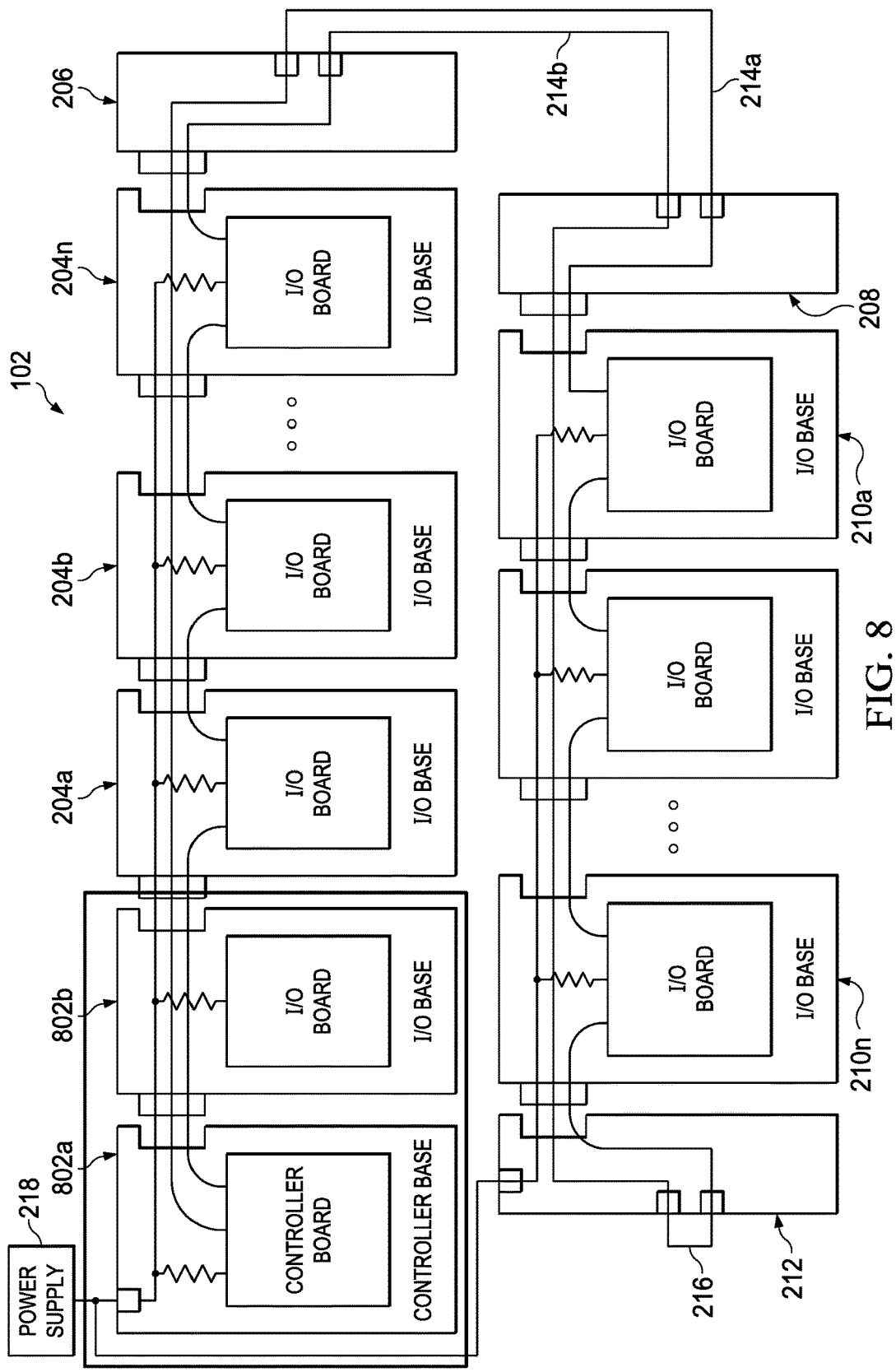

FIG. 8 illustrates an example of the RTU 102 with redundant controller modules 802a-802b. Each controller module 802a-802b could be implemented using a separate kernel board 418, and the connector 512 in each kernel board 418 could connect that kernel board 418 to the IOTA board 416 and to the other kernel board 418 (such as by using an extra Ethernet connection). Communications between the controller modules 802a-802b could occur via various communication interfaces 508. When multiple redundant controller modules 802a-802b are present, the IOTA board 416 could be used to automatically manage which redundant controller module has control of each I/O module and provide seamless switchover upon a failure of a controller module.

Figure 9:
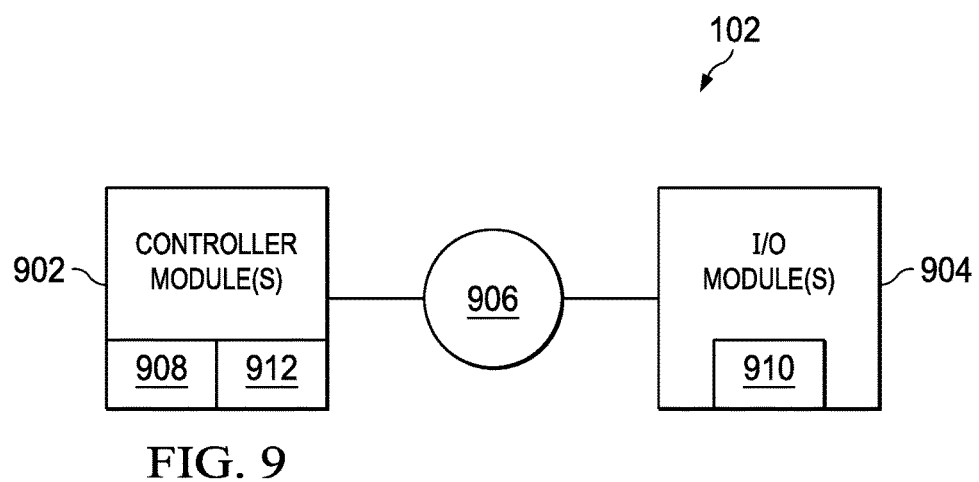

FIG. 9 illustrates an example implementation of the RTU 102 in a more distributed manner. As shown in FIG. 9, the RTU 102 includes one or more controller modules 902, which could represent a single controller module or a redundant set of controller modules. The RTU 102 also includes one or more I/O modules 904, such as one or more I/O modules that support the use of reconfigurable I/O channels as described above. Note, however, that an I/O module 904 could also support one or more fixed types of I/O channels.

In FIG. 9, however, the I/O module(s) 904 here are separated (and possibly quite remote) from the controller module(s) 902. A network 906 couples the I/O module(s) 904 to the controller module(s) 902 and can be used to transport signals between the components of the RTU 102. The network 906 represents any suitable communication path(s) for transporting information between components of an RTU. The network 906 could, for instance, represent a fault-tolerant electrical or fiber optic Ethernet ring or other communication path(s).

In some embodiments, the components 902-904 of the RTU 102 can be powered separately. For example, a power supply 908 can be used to power the controller module(s) 902, and a power supply 901 can be used to power the I/O module(s) 904. Each power supply 908-910 includes any suitable source of operating power, such as a "solar power with battery backup" power supply.

In addition, in some embodiments, the controller module(s) 902 could be coupled to one or more local I/O modules 912. The local I/O module(s) 912 provide for the local connection of the controller module(s) 902 to field devices or other devices. The local I/O module(s) 912 could have one or more fixed types of I/O channels and/or one or more reconfigurable I/O channels.

Although FIGS. 2 through 9 illustrate details of an example RTU 102, various changes may be made to FIGS. 2 through 9. For example, the number(s) and type(s) of ports and interfaces shown in FIGS. 2 through 9 are for illustration only. Also, the functional divisions of the RTU 102 shown in FIGS. 2 through 9 are for illustration only. Various components in FIGS. 2 through 4 could be omitted, combined, or further subdivided and additional components could be added according to particular needs.

Figure 10:
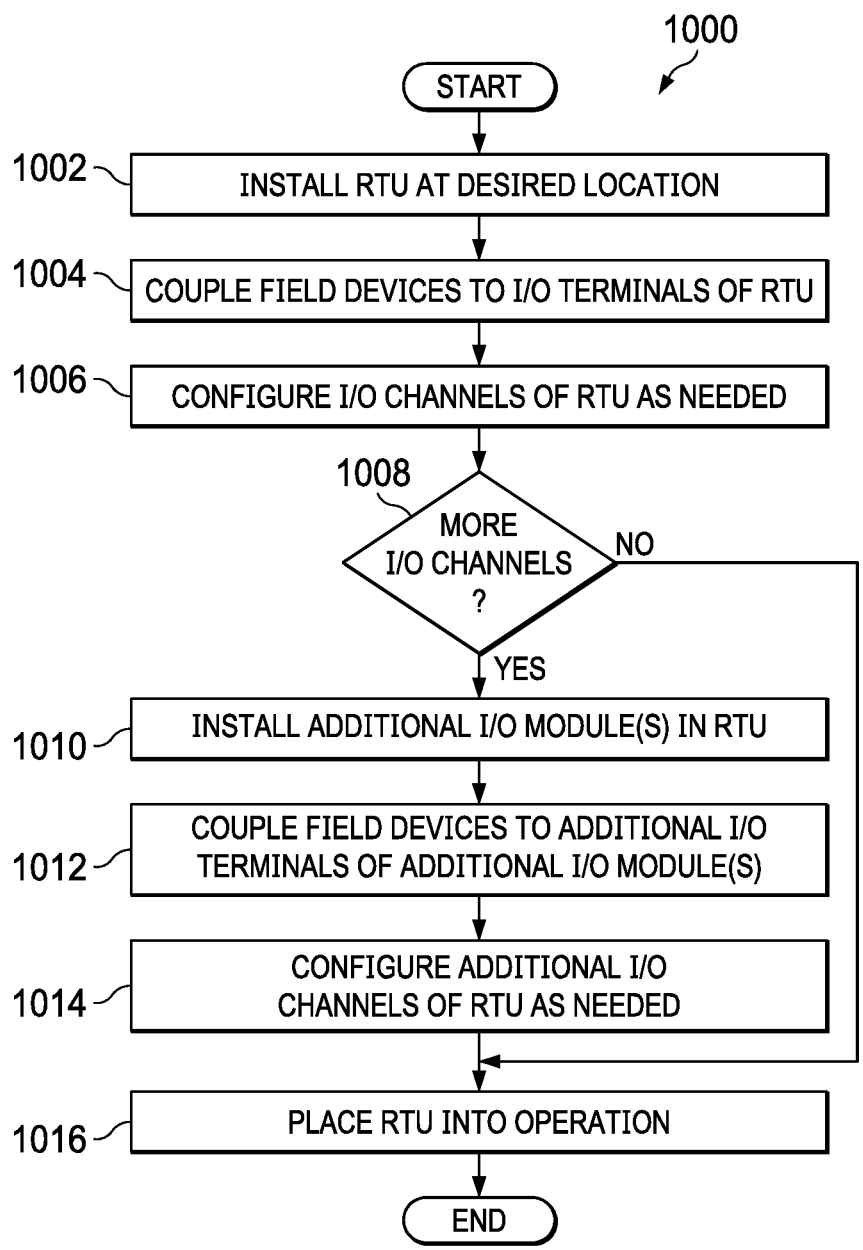
FIG. 10 illustrates an example method for using universal input/output with an RTU according to this disclosure.

FIG. 10 illustrates an example method 1000 for using universal input/output with an RTU according to this disclosure. For ease of explanation, the method 1000 is described with respect to the RTU 102 shown in FIGS. 2 through 9 operating in the system 100 of FIG. 1. The method 1000 could be used by any suitable RTU and in any suitable system.

As shown in FIG. 10, an RTU is installed at a desired location at step 1002. This could include, for example, personnel installing the RTU 102 in a cabinet or other structure in the field. One or more field devices are coupled to one or more I/O terminals of the RTU at step 1004. This could include, for example, the personnel coupling electrical lines from the field devices 106 to the I/O terminals 410 of the RTU 102. Note, however, that a field device can be coupled directly or indirectly to the RTU 102, such as via a fault-tolerant Ethernet ring or other connection(s). One or more I/O channels of the RTU are configured as need at step 1006. This could include, for example, the personnel providing data to the control logic 516 and the control logic 516 providing control signals to one or more I/O channels 606a-606n in the I/O modules 204a-204n. The control signals can configure each I/O channel 606a-606n as an AI (with or without digital communication), AO (with or without digital communication), DI, DO, or PI channel.

A determination is made whether more I/O channels are needed at step 1008. This could include, for example, the personnel determining whether the RTU 102 contains enough built-in I/O channels (in the I/O modules 204a-204n). If not, one or more additional I/O modules are installed at step 1010. This could include, for example, the personnel coupling the expansion board 206 of the RTU 102 to an expansion board 208 coupled to additional I/O modules 210a-210n. One or more additional field devices are coupled to the additional I/O module(s) at step 1012, and additional I/O channels of the RTU are configured as needed at step 1014. This could include, for example, the personnel providing data to the control logic 516 and the control logic 516 providing control signals to one or more I/O channels 606a-606n in the additional I/O module(s) 210a-210n.

The RTU is placed into operation at step 1016. This could include, for example, the RTU 102 transmitting or receiving data via the configurable I/O channels in the I/O modules 204a-204n, 210a-210n. In this way, the I/O channels of the RTU 102 can be configured as needed in the field. There is no need to install fixed types of I/O channels in the RTU 102 prior to installation of the RTU 102.

Although FIG. 10 illustrates one example of a method 1000 for using universal input/output with an RTU, various changes may be made to FIG. 10. For example, while shown as a series of steps, various steps in FIG. 10 could overlap, occur in parallel, occur in a different order, or occur multiple times. Also, as noted above, the RTU 102 could include one or more fixed I/O channels, and the reconfigurable I/O channels of the RTU 102 could reside within the I/O modules 204a-204n or within the additional modules 210a-210n. If the I/O modules 204a-204n contain only fixed I/O channels, step 1006 can be omitted. Similarly, if the I/O modules 210a-210n contain only fixed I/O channels, step 1014 can be omitted.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a remote terminal unit (RTU) comprising:
input/output (I/O) terminals configured to be coupled to at least one industrial control and automation field device;
one or more first I/O modules comprising one or more first reconfigurable I/O channels, each first reconfigurable I/O channel configured to be coupled to a pair of the I/O terminals, each first reconfigurable I/O channel configurable as an analog input, an analog input supporting digital communication, an analog output, an analog output supporting digital communication, a digital input, a digital output, and a pulse accumulator input for communication through the pair of I/O terminals;
each of the one or more first reconfigurable I/O channel comprises:
a digital logic block configured to control operating states for devices connected to the pair of I/O terminals using logic signals;
an analog common resource block configured to convert digital and analog signals between the digital logic block and the pair of I/O terminals;
a multiplexer block configured to receive a current signal from the analog common resource block and output a voltage signal to the analog common resource block; and
an output circuit block that comprises a plurality of switches and is configured to:
connect the current signal from the analog common resource block to a first I/O terminal of the pair of I/O terminals; and
connect a second I/O terminal of the pair of I/O terminals to an input of the multiplexer block;
a first expansion board coupled to the one or more first I/O modules;
a second expansion board configured to be coupled to one or more second I/O modules comprising one or more second reconfigurable I/O channels, wherein the second expansion board is connected to the first expansion board;
first and second electric paths formed through the first expansion board and the second expansion board, wherein the first and second electric paths meet at a loop after a final expansion board to indicate a lack of any additional I/O modules or additional expansion boards;
at least one processing device configured to control a configuration of each of the one or more first reconfigurable I/O channels and each of the one or more second reconfigurable I/O channels and to control the one or more second reconfigurable I/O channels through the one or more first I/O modules;
a first circuit board coupled to the I/O terminals and the first expansion board, wherein the first circuit board is further coupled to one or more serial interfaces, one or more uplink/downlink ports, and one or more transformers coupled to the first expansion board;
a second circuit board coupled to the at least one processing device, wherein the second circuit board is further coupled to one or more transceivers configured to communicate with the first circuit board; and
a third circuit board coupled to the one or more first I/O modules, wherein the third circuit board is further coupled to a power converter, the power converter configured to convert power received from the second circuit board;
wherein the first circuit board is coupled to the second and third circuit boards.

2. The apparatus of claim 1, wherein the RTU further comprises:
a first controller comprising the at least one processing device.

3. The apparatus of claim 2, wherein:
the one or more first reconfigurable I/O channels in the one or more first I/O modules are coupled directly to the first controller; and
the one or more second reconfigurable I/O channels in the one or more second I/O modules are coupled indirectly to the first controller via the first expansion board.

4. The apparatus of claim 2, wherein the first and second electrical paths extend from the first controller through the one or more first I/O modules and the one or more second I/O modules.

5. The apparatus of claim 2, wherein:
the RTU further comprises a second controller; and
the first controller is configured to operate as a primary controller and the second controller is configured to operate as a secondary controller.

6. The apparatus of claim 1, wherein the plurality of switches comprises:
a first switch coupled between a sense resistor and the first I/O terminal;
a second switch coupled between the second I/O terminal and an analog ground;
a third switch coupled between a negative side of a second resistor and the analog ground; and
a fourth switch coupled between the first I/O terminal and the negative side of the second resistor.

7. The apparatus of claim 1, wherein the RTU further comprises:
one or more fixed I/O channels, each fixed I/O channel comprising one of: a non-reconfigurable input channel and a non-reconfigurable output channel.

8. A system comprising:
at least one industrial control and automation field device; and
a remote terminal unit (RTU) comprising:
input/output (I/O) terminals configured to be coupled to the at least one field device;
one or more first I/O modules comprising one or more first reconfigurable I/O channels, each first reconfigurable I/O channel configured to be coupled to a pair of the I/O terminals, each first reconfigurable I/O channel configurable as an analog input, an analog input supporting digital communication, an analog output, an analog output supporting digital communication, a digital input, a digital output, and a pulse accumulator input for communication through the pair of I/O terminals;
each of the one or more first reconfigurable I/O channel comprises:
a digital logic block configured to control operating states for devices connected to the pair of I/O terminals using logic signals;
an analog common resource block configured to convert digital and analog signals between the digital logic block and the pair of I/O terminals;

a multiplexer block configured to receive a current signal from the analog common resource block and output a voltage signal to the analog common resource block; and an output circuit block that comprises a plurality of switches and is configured to:
  connect the current signal from the analog common resource block to a first I/O terminal of the pair of I/O terminals; and
  connect a second I/O terminal of the pair of I/O terminals to an input of the multiplexer block;

a first expansion board coupled to the one or more first I/O modules;

a second expansion board configured to be coupled to one or more second I/O modules comprising one or more second reconfigurable I/O channels, wherein the second expansion board is connected to the first expansion board;

first and second electric paths formed through the first expansion board and the second expansion board, wherein the first and second electric paths meet at a loop after a final expansion board to indicate a lack of any additional I/O modules or additional expansion boards;

at least one processing device configured to control a configuration of each of the one or more first reconfigurable I/O channels and each of the one or more second reconfigurable I/O channels and to control the one or more second reconfigurable I/O channels through the one or more first I/O modules;

a first circuit board coupled to the I/O terminals and the first expansion board, wherein the first circuit board is further coupled to one or more serial interfaces, one or more uplink/downlink ports, and one or more transformers coupled to the first expansion board;

a second circuit board coupled to the at least one processing device, wherein the second circuit board is further coupled to one or more transceivers configured to communicate with the first circuit board; and a third circuit board coupled to the one or more first I/O modules, wherein the third circuit board is further coupled to a power converter, the power converter configured to convert power received from the second circuit board;

wherein the first circuit board is coupled to the second and third circuit boards.

9. The system of claim 8, wherein:
the RTU further comprises a first controller comprising the at least one processing device;
the one or more first reconfigurable I/O channels in the one or more first I/O modules are coupled directly to the first controller; and
the one or more second reconfigurable I/O channels in the one or more second I/O modules are coupled indirectly to the first controller via the first expansion board.

10. The system of claim 9, wherein:
the RTU further comprises a second controller; and
the first controller is configured to operate as a primary controller and the second controller is configured to operate as a secondary controller.

11. The system of claim 9, wherein the first and second electrical paths extend from the first controller through the one or more first I/O modules and the one or more second I/O modules.

12. The system of claim 8, wherein the plurality of switches comprises:

a first switch coupled between a sense resistor and the first I/O terminal;
a second switch coupled between the second I/O terminal and an analog ground;
a third switch coupled between a negative side of a second resistor and the analog ground; and
a fourth switch coupled between the first I/O terminal and the negative side of the second resistor.

13. The system of claim 8, wherein the RTU further comprises:
a controller that is physically separated from the one or more first I/O modules; and
one or more communication paths configured to communicatively couple the controller and the one or more first I/O modules; and
wherein the controller and the one or more first I/O modules are configured to be powered by different power supplies.

14. The system of claim 8, further comprising:
an asset manager configured to configure and manage operations of the at least one field device via the RTU.

15. The system of claim 8, wherein the RTU further comprises:
one or more fixed I/O channels, each fixed I/O channel comprising one of: a non-reconfigurable input channel and a non-reconfigurable output channel.

16. A method comprising:
coupling at least one industrial control and automation field device to input/output (I/O) terminals of a remote terminal unit (RTU);

using at least one processing device, configuring (i) one or more first reconfigurable I/O channels that are coupled to the I/O terminals in one or more first I/O modules that are coupled to a first expansion board of the RTU and (ii) one or more second reconfigurable I/O channels in one or more second I/O modules that are coupled to a second expansion board of the RTU, wherein the at least one processing device controls the one or more second reconfigurable I/O channels through the one or more first I/O modules;

each of the one or more first reconfigurable I/O channel comprises:
  a digital logic block configured to control operating states for devices connected to the pair of I/O terminals using logic signals;
  an analog common resource block configured to convert digital and analog signals between the digital logic block and the pair of I/O terminals;
  a multiplexer block configured to receive a current signal from the analog common resource block and output a voltage signal to the analog common resource block; and
  an output circuit block that comprises a plurality of switches and is configured to:
    connect the current signal from the analog common resource block to a first I/O terminal of the pair of I/O terminals; and
    connect a second I/O terminal of the pair of I/O terminals to an input of the multiplexer block;

forming first and second electric paths through the first expansion board and the second expansion board, wherein the first and second electric paths meet at a loop after a final expansion board to indicate a lack of any additional I/O modules or additional expansion boards;

coupling a first circuit board to the I/O terminals and the first expansion board, wherein the first circuit board is further coupled to one or more serial interfaces, one or more uplink/downlink ports, and one or more transformers coupled to the first expansion board;

coupling a second circuit board to the at least one processing device, wherein the second circuit board is further coupled to one or more transceivers configured to communicate with the first circuit board;

coupling a third circuit board to the one or more first I/O modules, wherein the third circuit board is further coupled to a power converter, the power converter configured to convert power received from the second circuit board;

wherein each first and second reconfigurable I/O channel is configurable as an analog input, an analog input supporting digital communication, an analog output, an analog output supporting digital communication, a digital input, a digital output, and a pulse accumulator input for communication through a pair of the I/O terminals; and wherein the first circuit board is coupled to the second and third circuit boards.

17. The method of claim 16, further comprising:

coupling a first controller and a second controller to the one or more first I/O modules; and operating the first controller and the second controller as a redundant pair.

18. The method of claim 16, further comprising:

after configuring the one or more first reconfigurable I/O channels, reconfiguring at least one of the one or more first reconfigurable I/O channels to be of a different type of I/O channel.

* * * * *